March 23, 1965 J. E. WALDO 3,174,668

FLEXIBLE TAPE TRANSPORT

Filed Oct. 29, 1963

2 Sheets-Sheet 1

INVENTOR

John E. Waldo

BY Joseph A. Genovese & Max L. Libman

ATTORNEYS

March 23, 1965 J. E. WALDO 3,174,668

FLEXIBLE TAPE TRANSPORT

Filed Oct. 29, 1963

2 Sheets-Sheet 2

INVENTOR

John E. Waldo

BY Joseph A. Genovese & Max L. Libman

ATTORNEYS

United States Patent Office 3,174,668
Patented Mar. 23, 1965

3,174,668
FLEXIBLE TAPE TRANSPORT

John E. Waldo, Silver Spring, Md., assignor, by mesne assignments, to Control Data Corporation, Minneapolis, Minn., a corporation of Minnesota Filed Oct. 29, 1963, Ser. No. 319,838
5 Claims. (Cl. 226—97)

This invention relates to feeders, and particularly to devices for feeding flexible, elongate members, henceforth called "tape" or "flexible tape."

No difficulty is usually experienced in moving a tape so long as the motion is continuous. Indeed, all that is required is a pair of reels for the tape, and a motor to drive one of the reels thereby winding tape from one reel to the other. Also, no formidable problems are encountered in moving a tape in a stepping (indexing) mode so long as the indexing frequency and design speeds are low. Simple or high quality clutches, brakes, oscillatory and/or reciprocatory mechanical movements can be used for these purposes. This is especially true when the tape has sprocket holes which not only facilitate stopping and starting the tape but also enable the tape feeder to move the tape precise increments for each index cycle. Examples of tape feeders of this kind are found in numerous paper tape punches capable of reliable operation at speeds in excess of 100 characters (index cycles) per second.

With the above in view, I endeavored to greatly increase the reliable operating speeds of an indexing tape feeder. It was my objective to attain these high speeds (more than 300 c.p.s.) not withstanding the presence or absence of sprocket holes in the tape. Accordingly, I sought a new method of moving tape in a step-by-step (indexing) manner which did not in any way rely on intermittent mechanical movements like those of the prior art e.g. stepping a sprocket, using an oscillatory or reciprocatory mechanical movement, etc. At very high speeds the accelerations and decelerations of sprocketed tape, clutches, brakes, oscillatory and reciprocatory mechanical mechanisms, etc. are inordinately high.

My invention fulfills the above aims in the following way: I provide a surface on which to support a portion of the tape, for instance two or three inches. Suitable means, for example a vacuum system, prevent the portion of the tape from moving lengthwise on the surface. With the tape portion held in this manner, a wave is formed at one end of the tape portion, and the wave is propagated lengthwise of the tape portion to and through the end of the vacuum-held tape portion. The wave is formed by "new" tape (an increment being added to one end of the tape portion on the surface). The wave is propagated by successively lifting parts of the supported tape from the surface in advance of the traveling wave, while the trailing portions of the tape portion are being returned to the supporting surface. Thus, as the wave travels from the in-feed end of the tape portion to the opposite end, the tape portion is at rest except for the parts of the tape which instantaneously comprise the wave. The traveling wave is analogous to the hydraulic action of a wave "on" the surface of a body of water.

Accordingly, an object of my invention is to provide a tape feeder which uses what I believe to be a new concept in intermittently feeding tape.

Another object of my invention is to provide a tape feed device which relies on the formation and propagation of a wave in the tape to index the tape.

Some mention was made before of the obvious mechanical limitations of the conventional oscillatory, reciprocatory, and stop-start mechanisms used in prior tape feeders. In contrast, my feeder relies on the formation and propagation of a wave in the tape, and both the formation and propagation can be accomplished by a constantly movable member. The member can operate at a selected fixed speed so that I have no acceleration problems to contend with owing to the lack of stop-start operation, oscillating mechanical movements etc.

Although sprocket holes are not essential for my invention, if they are available in a tape they can be used as a means to position the tape portion on the supporting surface. Thus, if used, they will correspond to my previously mentioned vacuum system whose purpose is to hold the tape portion against longitudinal (and transverse) sliding motion on a support. Therefore, since my use of the sprocket holes in the tape is not to drive the tape, hole-tearing is not a factor as it is in prior sprocketed tape feeders.

As implied above my tape feeder fulfills the need in modern high speed paper tape punches of the type which require that the tape be at or near rest during the punch operation. However, there are numerous other uses for my invention. For instance, my tape feeder may be used as an input device for an optical (or magnetic) character reading machine. Reading the tape of a tally roll (with or without sprocket holes) or a cash register tape are typical uses. Since many embodiments of my invention do not rely on sprocket holes, my feeder can be used in fields other than data processing where the tape customarily has sprocket holes. For instance, my feeder can be used for advancing photographic film or any other flexible elongate tape.

Other objects and features of importance, for instance the capability of simultaneously feeding more than one tape, will become apparent in following the description of the illustrated forms of the invention which are given by way of example only.

FIGURES 1–1*d* are schematic views showing a supported portion of tape together with an infeed portion of tape being formed into a wave, and the wave being propagated along the length of the supported tape portion.

FIGURES 2–2*b* are diagrammatic elevational views showing substantially the same subject matter as FIGURES 1–1*d*.

Figures 1, 1A, 1B, 1C, 1D, 2, 2A, 2B, 3, 4:
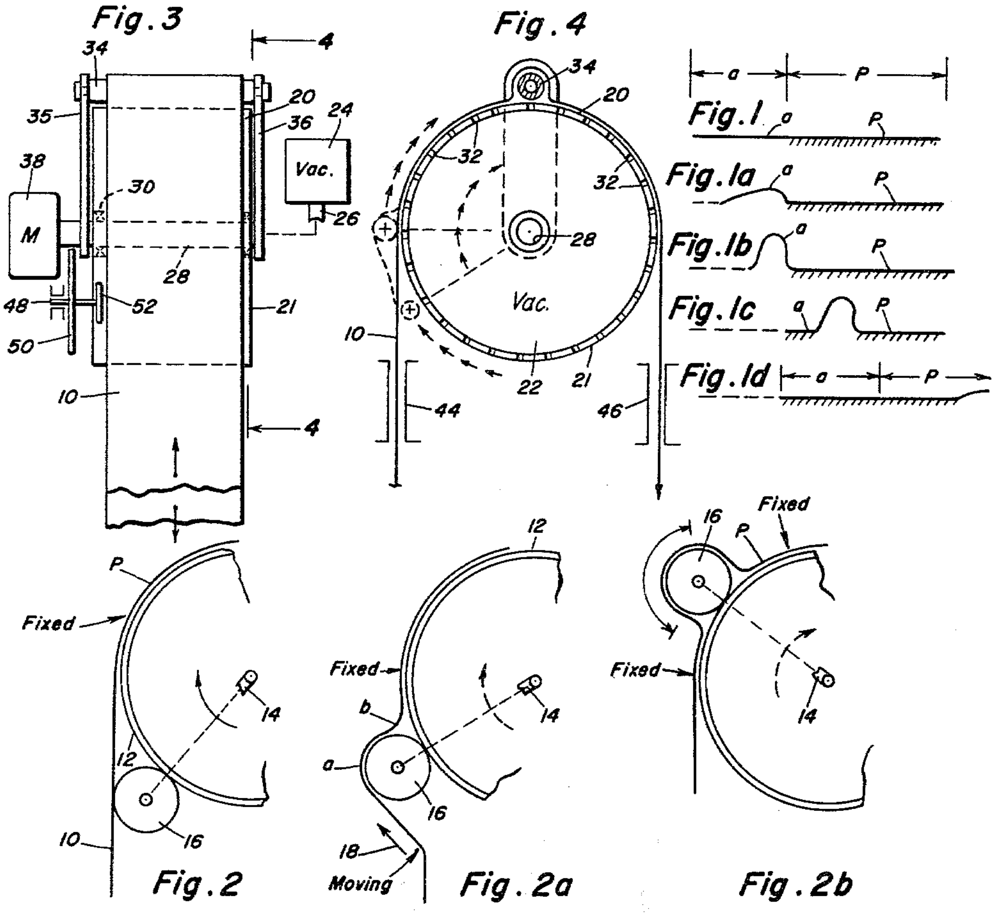
FIGURE 3 is an elevational view of one form of my invention.
FIGURE 4 is a sectional view taken on line 4—4 of FIGURE 3.

FIGURES 1–1*d* show the behavior of tape 10 during one feeding cycle. Portion P of tape 10 (FIGURE 1) is fixed against longitudinal motion, while the in-feed part "*a*" is not fixed. FIGURE 1*a* shows how the in-feed portion "*a*" of the tape is moved toward the fixed portion P, and it begins to curve upwardly. FIGURE 1*b* shows in-feed portion "*a*" in the form of a substantially complete wave, while portion P still remains in its original fixed position as shown in FIGURE 1. In use, a small fraction of the fixed, supported tape portion P (FIGURE 2*b*) may enter into and become a portion of the wave, but this is neglected in FIGURES 1–1*d*. FIGURE 1*c* shows the wave propagated to the right. The traveling or propagation of the wave is achieved by lifting successive increments of tape ahead of the wave and allowing them to merge into and become a part of the wave while traveling increments of tape behind the wave return to the stationary or held position. FIGURE 1*d* shows the wave finally discharging from the right end of the length P of tape. What remains in the new, supported or held position is a fraction of the original length P (FIGURE 1) and all of the in-feed portion *a* of new tape. Successive indexing cycles are accomplished in a like manner.

FIGURES 2–2*b* are diagrammatic structural representations showing more graphically how to implement the intermittent or cyclic indexing feeding system of FIGURES 1–1*d*. Tape 10 is shown with a portion P adhered to supporting surface 12, e.g. pneumatically, as will be described later. Surface 12 is arcuate although this is not essential. A radial arm 14 is provided with a transverse roller 16 adjacent to the surface 12, and the arm is rotated by a motor or the equivalent (shown in FIGURE 3). When roller 16 is in the position of FIGURE 2, all portions of tape 10 are fixed relative to surface 12. It is important to note that tape 10 is fixed with respect to surface 12 and need not necessarily be fixed in space. If the surface 12 is stationary, then tape 10 is fixed in space. But, if the surface 12 is moving at one speed, and the roller 16 is being displaced in its orbit at a greater speed, tape 10 is fixed with respect to surface 12 but not in space, and my system will be perfectly operative.

As roller 16 moves to the position shown in FIGURE 2*a*, the tape portion P remains fixed with respect to surface 12 as far as longitudinal motion is concerned. The in-feed portion *a* of tape 10 has two components of motion imparted thereto by member 16. One component is in the direction of arrow 18 and another is in a direction radially outwardly of the arcuate surface 12 (away from the surface). Thus, a quantity of new tape is in-fed to start the formation (FIGURE 2*a*) of a wave as shown in FIGURE 1*a*. During the formation of the wave a very small fraction of tape at *b* in FIGURE 2*a* may pull radially away from surface 12 so that it becomes a portion of the wave, but the fraction of tape at *b* can be either reduced to zero (so that there is none) or be maintained negligible.

FIGURE 2*b* shows roller 16 when it has moved approximately 40° from the position of FIGURE 2*a*. In this position the tape portion P ahead of the wave is held with respect to surface 12, and the tape behind the roller is returned to a fixed position against surface 12. Of the entire wave, the major portion, as shown by the measuring lines, corresponds to the quantity of tape which is fed during each indexing cycle. When the wave has traveled to the end of the supported portion P of the tape, it leaves the influence of the holding means associated with the surface 12 and is advanced as the increment of tape fed during each cycle.

Figure 5:
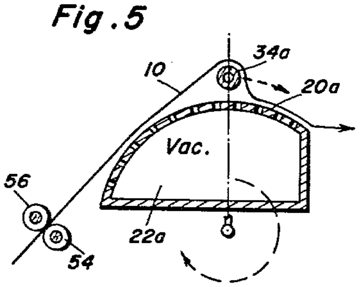
FIGURE 5 is a diagrammatic view of a modification showing pinch rollers to regulate the quantity of tape which is fed during each indexing cycle, by altering the profile of the wave.
Figure 6:
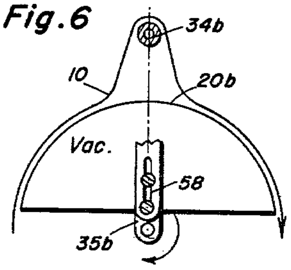
FIGURE 6 is a diagrammatic elevational view showing another modification where the profile of the wave is adjustable for regulating the quantity of tape which is fed during each index cycle.
Figure 7:
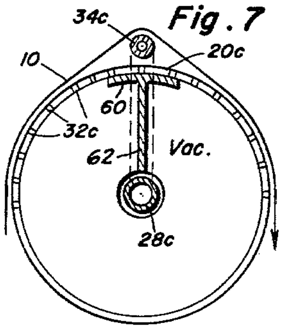
FIGURE 7 is a diagrammatic elevational view showing another modification whose objective is the same as those of FIGURES 5 and 6.

Attention is now directed to FIGURES 3 and 4 showing an embodiment of my feeder. Tape 10 is engaged with surface 20 of a rotary drum 21 whose interior defines a vacuum chamber 22. A source 24 of vacuum is connected to chamber 22, for instance by vacuum line 26. The vacuum line is connected by means of a conventional coupling (not shown) to a perforated, hollow spindle 28 positioned axially in sealed bearings 30 in the end walls of the drum. The cylindrical wall of the drum which defines surface 20 has a plurality of vacuum holes 32 (FIGURE 4) opening through the entire surface 20. For embodiments where the surface 20 is fixed, holes are not required in the entire surface 20; in fact, a portion of the drum can be omitted as shown in FIGURES 5–7.

The means for forming and propagating the successive waves in the tape consist of a member 34 corresponding to roller 16 of FIGURE 2. Thus, roller 34 mounted in bearings near the outer ends of a pair of arms 35, 36. The inner ends of the arms are attached to the spindle 28 on the exterior of the drum, and the spindle is secured by a direct connection or a coupling (not shown) to the shaft of motor 38 which can have a speed changer (not shown). As motor 38 operates, member 34 is required to execute an orbital path of travel (FIGURE 4) for the purpose discussed above.

As mentioned before it is important that a portion (P) of tape 10 be held with respect to surface 20 to enable the waves to be formed and advanced along the length of the held portion of the tape. The held portion of the tape may be either at rest or movable in space so long as it is fixed with respect to the surface 20. Thus, surface 20 can be fixed by being attached to a frame (shown in FIGURE 5). Alternatively (FIGURES 3 and 4), the surface 20 can be movable at a speed different from the orbital speed of member 34. For this purpose any drive mechanism can be used, and such a mechanism is shown as a set of friction drivers (FIGURE 3) made of a bearing-supported lay shaft 48 having a large friction wheel 50 attached to it and engaging the shaft of motor 38 (or the exterior part of spindle 28), together with a small friction roller 52 which is also attached to shaft 48. The small diameter roller contacts the surface of support 20 so that it rotates the support 20 at a speed (due to the size of the friction roller assembly) different from the orbital speed of member 34.

Vertical tape guides 44 and 46 (FIGURE 4) constrain the tape approaching and leaving the drum surface 20. As discussed later, the position of the guides can be changed, particularly for embodiments which feed more than one tape.

Attention is now directed to FIGURE 5 showing surface **20*a* and vacuum chamber 22*a* of forms slightly different from those of FIGURE 4. Since the entire cylindrical surface is not required in embodiments where surface 20*a* is stationary, FIGURE 5 shows the variation. In addition, I have illustrated means to alter the profile of the wave which is formed in the tape by the action of member 34*a*. The illustrated means consist of a pair of pinch rollers 54 and 56** at the in-feed end of the tape, although any equivalent means to provide a drag on the in-feed end of the tape will accomplish the desired result of selectively altering the quantity of tape which is fed during each indexing cycle.

FIGURE 6 shows a further modification where the roller member **34*b* is radially adjustable with respect to surface 20*b* by being secured to arms 35*b* which are extensively adjustable by conventional means e.g. the illustrated bolts and slots assembly 58. It is now obvious that the greater the distance between member 34*b* and surface 20*b***, the greater will be the quantity of tape which is fed during each indexing cycle.

In FIGURE 7 I have shown another way to alter the quantity of tape which is fed during each indexing cycle. By comparison of FIGURES 5, 6 and 7 it is evident that the profile of the wave is altered in three different ways. In FIGURE 5 the trailing part of the wave has a much smoother curvature than the forward part. In FIGURE 6 the wave remains symmetrical but its amplitude is increased. In FIGURE 7 both the leading and trailing portions of the wave are flatter, lengthened, while the amplitude of the wave remains small in comparison to that of FIGURE 6. This is accomplished by attaching a sliding valve 60 to an arm 62 which is secured to spindle 28*c*. The sliding valve traverses the inside of the member which defines surface 20*c* and closes one or more of the vacuum holes 32*c* which confront and/or approximately confront the roller member 34*c*. Thus, part of the surface 20*c* between roller 34*c* and valve 60 is not energized (the pertinent ports or holes 32*c* are closed) as the member 34*c* orbits around surface 20*c*.

Figure 8:
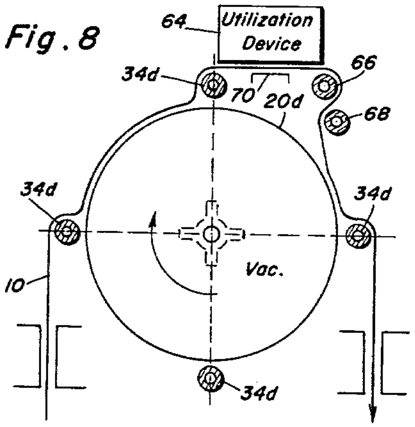
FIGURE 8 is a diagrammatic elevational view showing another embodiment in which a portion of the tape is separated from the supporting surface to provide a tape area for utilization between the in-feed and discharge ends.

In all embodiments, as the member or members 34, 34*a*, etc. form and propagate a wave, the majority of the supported and held tape remains at rest. It is only that part of the held portion (see *a* and *p* in FIGURES 1–2*b*) of tape which is instantaneously concerned with the wave that is in motion. Thus, as shown in FIGURE 8 a part of the tape can be separated from surface 20*d* to be presented to a utilization device 64. The utilization device can be an optical, magnetic or tactile reader, a punch, a printer, or any other compatible device. Accordingly, I have illustrated a pair of guide, idler rollers 66 and 68 positioned to constrain a part of the tape over a support 70 adjacent to surface 20*d* but removed from the path of travel of members 34*d*. FIGURE 8 shows a plurality of members 34*d*, it being understood that any member may be used in each form of my feeder.

Figures 9, 13:
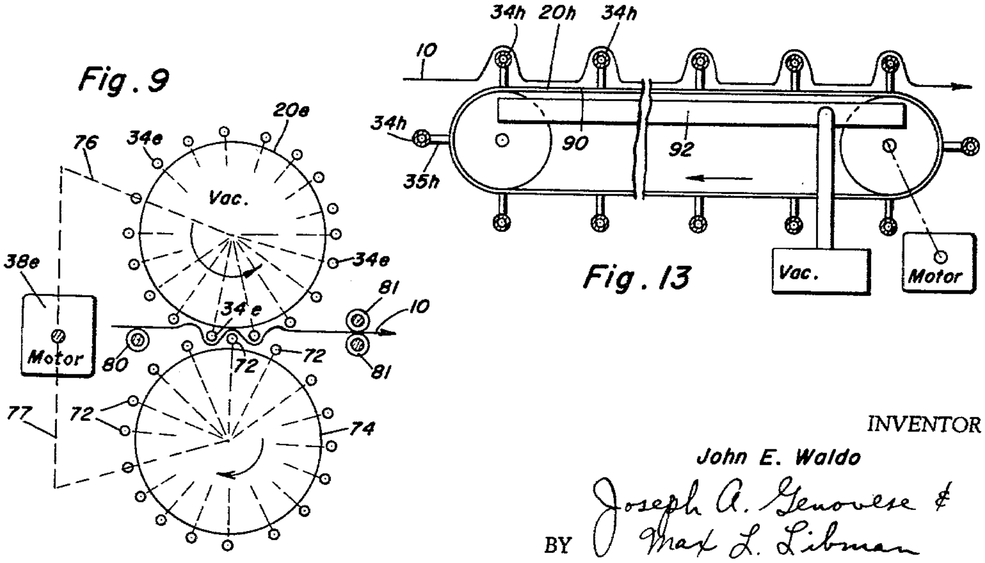
FIGURE 9 is a diagrammatic elevational view showing means exterior of the supporting surface of the tape to help to maintain the wave during its propagation.
FIGURE 13 is a side view showing a modification wherein the supporting surface for the tape portion is rectilinear rather than curved.

The embodiment of FIGURE 9 distinguishes from the others by having a plurality of formers 72 which operate from the exterior surface of the tape. Where a large number of members 34*e* are used, unless surface 20*e* is made with a very large radius of curvature members 34*e* will be close together so that there is the chance that the pneumatic holding means may not firmly attract and retain the parts of the tape between members 34*e* against surface 20*e*.

Thus, drum 74 is provided with a plurality of transverse members e.g. rollers 72, and is operated in synchronism with the orbital motion of members 34*e*. Drum 74 can be substituted by a group of radial arms, or an endless conveyor. The conveyor can be tangent to surface 20*e*, or conform to a part of it. Synchronism is diagrammatically shown by motor 38*e* together with drive lines 76 and 77 connected to the member 34*e*, supporting arms 35*e* and drum 74 (shown) or a conveyor (not shown). Tape 10 has its in-feed end guided over a roller 80 and its discharge end guided between out-feed rollers 81 (or the equivalent), while the portion of the tape between these rollers is indexed in a manner identical to the indexing of the tape in the previously described embodiments. The difference is that the outside surface of the tape is retained against surface 20*e* by the member 72 (or members) which becomes enmeshed between a pair of adjacent members 34*e* during the synchronous rotation.

Figure 10:
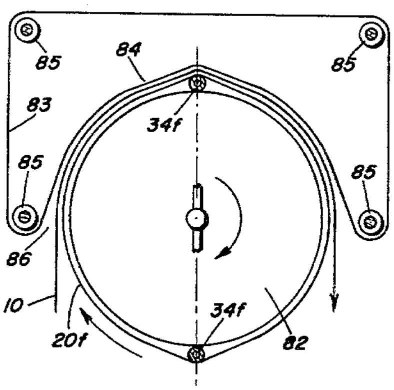
FIGURE 10 is a diagrammatic elevational view to show that the tape portion can be held by mechanical, rather than pneumatic, means.

The embodiment of FIGURE 10 shows that means other than a vacuum system, may be used to retain a portion of tape 10 fixed relative to a supporting surface 20*f* while waves are formed and advanced in the tape from the in-feed end to the discharge end thereof. In the illustration, supporting surface 20*f* is formed by a belt mounted on a stationary drum 82 in a manner such that one or more rollers 34*f* or equivalent members can pass between the confronting surfaces of the belt and drum during the orbital motion of the members. Thus, during operation of members 34*f* recirculating waves, one following the other, are formed in the belt. A second belt 83 is mounted with one of its flights 84 adjacent to a portion of surface 20*f*. The circuit of belt 83 is suitably defined by idlers 85 to conform to a part of surfaces 20*f*.

In operation of this form of the feeder, tape 10 is fed into the inlet 86 of the passageway defined by the confronting faces of belt flight 84 and surface 20*f*. Accordingly, as members 34*f* orbit, the inner and outer belts have waves formed therein with an increment of the tape (corresponding to FIGURES 1–2*b*) between them. Since the tape is free to provide in-feed increments of new tape the wave action as far as the tape is concerned produces a result which is identical to the wave action of the previously described embodiments. The wave propagation in the two belts, though, is somewhat different in that they are recirculating belts. This embodiment as well as the embodiment of FIGURE 9 can simultaneously feed a plurality of superimposed tapes because these embodiments provide restraint on the outer surface of the tape as well as on the inner surface thereof. In order to simultaneously feed more than one tape in the other embodiments, only minor rearrangement is necessary. For instance, the in-feed and discharge ends of the tape 10 can be substantially horizontal, and slightly less than one half of the cylindrical surface is used for one of the tapes. Assume this to be the upper half of surface 20 of FIGURE 4. Then, the second tape can be substantially horizontally disposed at the in-feed and discharge ends, and the lower half of surface 20 of FIGURE 4 can be used to hold a portion of the lower tape while the same member or members 34 are used to index both tapes; first one then the other. With respect to FIGURE 4, one tape will be stepped to the right and the other tape will be stepped to the left. In the embodiments of FIGURES 9 and 10 with two or more tapes concurrently being handled, both or all of the tapes will be simultaneously fed in the same direction.

Figure 11:
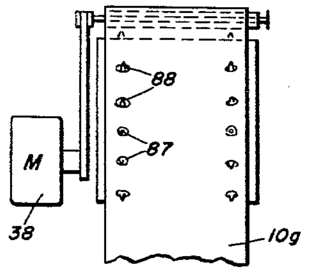
FIGURE 11 is an elevational view of a modification using sprocket holes and teeth for holding a portion of the tape while one or more waves are formed and advanced along the length of the tape.
Figure 12:
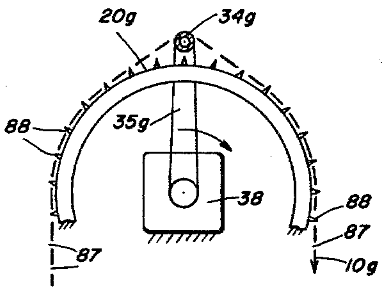
FIGURE 12 is a side elevational view of the modification of FIGURE 11.

In the previously described forms of this invention both pneumatic and mechanical means for holding a tape portion are described and illustrated. In instances where the tape 10*g* (FIGURES 11 and 12) has one or more rows of sprocket holes 87 the structural implementation of the invention can be materially simplified. The reason is that the pneumatic means (vacuum chamber 22 and holes 32) and mechanical means (belt flight 84 of FIGURE 10) merely serve the purpose of retaining a portion of the tape in a manner such that it cannot slide. However, the tape portion must be capable of moving perpendicular to its supporting surface so that a quantity of tape can be in-fed as the wave is being formed, and so that the wave can be propagated. Thus, sprocket holes 87 can be made to serve the same purpose by having a row of teeth 88 projecting from supporting surface 20*g*. The supporting surface is a part of a fixed member of a suitable shape, for instance arcuate as shown in FIGURE 12. The wave forming and propagating member 34*g* is preferably a roller attached at one end to an arm 35*g*, driven by motor 38. As in the other embodiments, member 34*g* extends transversely across and is slightly spaced from tape 10*g*. In operation the wave is formed as member 34*g* reaches and enters the in-feed part of the tape portion, the action being for member 34*g* to separate a fraction of the retained tape portion from surface 20*g* thereby separating the local area of the tape from the adjacent pins 88. As member 34*g* moves in its orbital path the wave is propagated by lifting increments of the tape portion ahead of the member 34*g* from the pins 87, and at the same time returning the trailing increments of the retained tape portion to the pins 88. In this form of my feeder as in the others, the retained tape portion is held fixed against lengthwise (and transverse) movement relative to its surface 20*g*, and surface 20*g* can be stationary as shown, or driven (not shown).

It is understood that any of the embodiments of my indexing feeder can be used as long or can be used in multiples of two, three or more. Further, I have described members 34, 34*a*, etc. as having a circular orbital motion. This is merely in the interest of design simplicity. As shown in FIGURE 13 one or more members 34*h* can have a motion other than circular orbital. Members 34*h* are shown attached by arms 35*h* to a porous belt 90 (or a separate conveyor) not shown. The belt 90 affords a suction energized surface 20*h* for tape 10 by having a vacuum box 92 positioned below one flight thereof. Thus, when members 34*h* are moved in the direction of the arrow (FIGURE 13), the successive members 34*h* form and propagate waves in the tape in a manner described. Other variations within the scope of the following claims may be resorted to. For example, in the various forms of my invention changes in phase of the tape as it is being fed, can be accomplished by rotating the supporting surface (e.g. 20 in FIGURE 4, 20*f* in FIGURE 10, etc.) clockwise or counterclockwise depending on whether it is desired to advance or retard the phase. Finally, in the opening paragraph herein, the term "tape" was defined as a flexible, elongate member. This obviously includes wire, plastic filaments and many things in addition to paper tape.

I claim:

1. In an incremental feeder for elongate flexible tape; tape supporting means; means for holding the tape in a manner such as to prevent a portion of the tape from longitudinally moving with respect to said supporting means; said supporting means having a tape inlet station and a tape discharge station; tape feeding means including a member transverse to said tape supporting means and movable completely about the tape supporting means in one direction, for feeding an increment of new tape longitudinally to the held portion at said inlet station, by forming a wave smaller than said held portion; said wave being made at least in part by the in-feed of new tape; and said feeding means also propagating the wave to said discharge station by separating advance progressive increments of said portion from said supporting means and concurrently allowing the trailing increments of the tape to be returned to said supporting means by said tape holding means, so that all of the tape portion remains at rest and retained by said holding means except for the parts of the tape which instantaneously from a part of the propagated wave.

2. The feeder of claim 1 and means for adjusting the size of said waves and thereby correspondingly adjusting the size of the increments of tape fed during each propagation of a said wave.

3. The subject matter of claim 2 wherein said adjusting means include an adjustment mechanism by which to selectively alter the distance between said member and said supporting means.

4. The subject matter of claim 1 and an additional member extending transversely of said tape supporting means and spaced from the first-mentioned member; and means mechanically coupling said member and said additional member for simultaneous movement about said tape supporting means, so that as each of said members enters and passes said inlet station a said wave is formed and propagated.

5. The subject matter of claim 1 wherein said tape supporting means includes a suction energized surface to which the tape is attracted and releasably held.

References Cited by the Examiner

UNITED STATES PATENTS

| | | | |
|---|---|---|---|
| 2,064,851 | 12/36 | Reinartz | 271—28 |
| 3,008,621 | 11/61 | Mason | 226—53 |

ROBERT B. REEVES, *Acting Primary Examiner.*

RAPHAEL M. LUPO, WILLIAM B. LA BORDE, *Examiners.*